United States Patent

[11] 3,590,768

| [72] | Inventors | Victor Shanok; Jesse P. Shanok, both of Brooklyn, N.Y. |
|---|---|---|
| [21] | Appl. No. | 788,578 |
| [22] | Filed | Jan. 2, 1969 |
| [45] | Patented | July 6, 1971 |
| [73] | Assignee | Glass Laboratories Company |

[54] COMBINATION DECORATIVE AND REFLECTIVE STRIP
6 Claims, 3 Drawing Figs.

[52] U.S. Cl.................................................. 116/28,
52/315, 52/716, 161/5, 161/106, 161/166,
161/214, 161/406, 250/71, 293/1, 293/60, 293/62,
293/69, 296/28, 296/93
[51] Int. Cl...................................................... B32b 15/08,
B60g 1/26, E04f 19/02
[50] Field of Search.......................................... 52/311,
312, 315, 716; 161/4, 5, 6, 123, 166, 214, 406;
293/1, 54 D, 62, 60, 69; 116/28, 35; 250/71, 72,
73, 75, 74, 76; 296/28, 93

[56] References Cited
UNITED STATES PATENTS

| 3,245,864 | 4/1966 | Shanok et al. | 161/106 |
| 2,712,190 | 7/1955 | Sobel | 161/5 |
| 3,152,950 | 10/1964 | Palmquist et al. | 161/214 |
| 3,176,584 | 4/1965 | DeVries et al. | 161/406 |
| 3,226,287 | 12/1965 | Shanok et al. | 161/4 X |
| 3,405,025 | 10/1968 | Goldman | 161/4 |
| 3,419,458 | 12/1968 | Brooks et al. | 161/123 X |
| 3,436,297 | 4/1969 | Brooks et al. | 161/123 X |
| 3,440,129 | 4/1969 | Anselm | 161/5 |
| 3,471,355 | 10/1969 | Truesdell et al. | 161/166 X |
| 3,471,979 | 10/1969 | Herr | 52/716 X |

Primary Examiner—Arthur L. La Point
Assistant Examiner—Howard Beltran
Attorney—Friedman and Goodman ABSTRACT: A combination decorative and reflective strip intended for use as border trim for an automobile rear window or at some other such advantageous location wherein said strip, which includes an encapsulated aluminum foil, during daylight simulates the appearance of chromium trim and at night has an encapsulated strip of reflective tape which reflects light impinging thereon to thereby provide a significant safety function.

PATENTED JUL 6 1971

3,590,768

INVENTORS
VICTOR SHANOK
JESSE P. SHANOK
BY Friedman & Goodman
Attorneys

COMBINATION DECORATIVE AND REFLECTIVE STRIP

The present invention relates generally to edge trimming material, and more particularly to an attachable strip or trim for an automobile window or the like which provides different daylight and night time visual appearances.

For purposes of illustration only, and not necessarily as a limitation of use, the strip hereof is advantageously attached as border trim along the edges of an automobile rear window, such trim being commonly referred to as reveal molding, and, in this attached position, makes a significant contribution not only to the appearance of the automobile but also in providing a visual safety signal to an approaching automobile. An effective safety signal naturally requires the use of a bright, highly visible color; yet such signal cannot be permitted to detract from the appearance of the automobile. In known prior art edge trims or the like, however, the visual appearance of the trim is at all times essentially the same and thus these prior art edge trims cannot adequately function as a safety signal device without noticeably detracting from the car's appearance, or vice versa.

Broadly, it is an object of the present invention to provide an improved strip, particularly for use as border trim about a car rear window, overcoming the foregoing and other shortcomings of the prior art. Specifically, it is an object to provide an automobile rear window reveal molding edge trim having different colored materials of construction which during daylight and night time provide different visual appearances.

An automobile combination decorative and reflective strip demonstrating objects and advantages of the present invention includes a superposed arrangement of plastic-encapsulated wide and narrow strips, respectively, of aluminum foil and red, light-reflective tape, the former strip effectively providing a simulated appearance, during daylight, of conventional chromium trim as is usually provided on automobiles, and the latter strip, at night, effectively reflecting any light impinging thereon and thereby serving a significant safety function. In a preferred embodiment, the improved combination strip hereof is in the shape of a rectangular frame and positioned over the rear window reveal molding.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
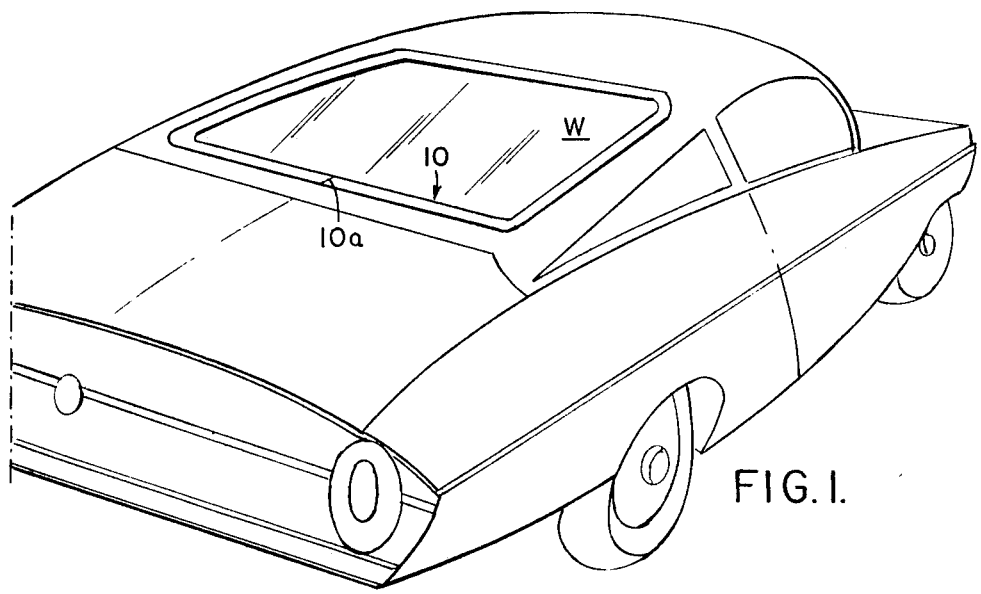
FIG. 1 illustrates a composite strip according to the present invention in the form of a rectangular frame and in a preferred operative position over the bordering trim or so-called reveal molding of the rear window of an automobile.
Figure 2:
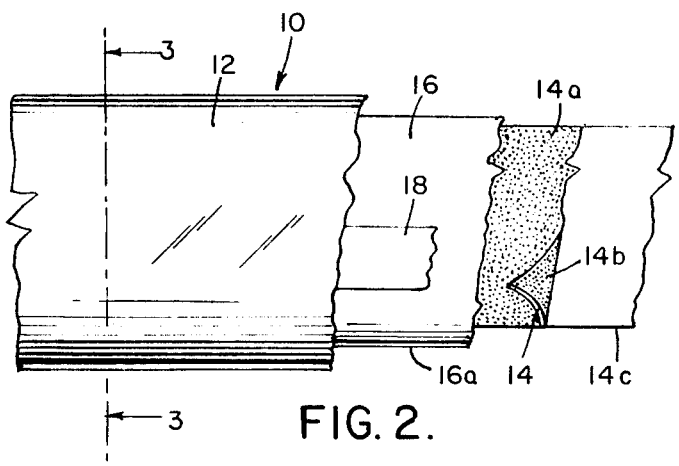
FIG. 2 is an isolated plan view of the strip, on an enlarged scale, with external portions thereof successively broken away to better illustrate the internal construction of the strip.

Reference is now made to the drawings wherein there is shown a composite strip, generally designated 10, the structural details of which are best illustrated in FIG. 2, 3 while FIG. 1 illustrates a significantly advantageous position for the strip wherein it is shaped as a rectangular frame and placed over the bordering trim or so-called reveal molding of the rear window of an automobile. That is, an appropriate length of the strip 10 is formed into a rectangular frame, the two ends abutting at 10a, and then used in accordance with the present invention as a covering for the reveal molding of the automobile rear window W.

Figure 3:
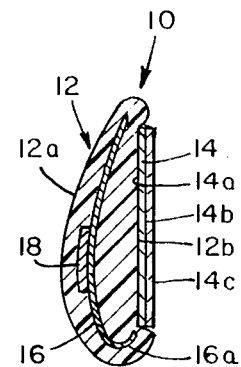
FIG. 3 is an enlarged side elevational view, in section taken on line 3-3 of FIG. 2, illustrating further structural details of the strip.

Reference is now made to FIGS. 2, 3 which best illustrate the preferred embodiment of a composite strip 10 according to the present invention. Strip 10 will be understood to be an extruded article of manufacture, in the extrusion of which selected materials are encapsulated in a transparent plastic body. An embodiment of extruding apparatus which may be used in the fabrication of the strip 10 is described in U.S. Pat. No. 3,245,864. More particularly, the extruding die of the apparatus is appropriately shaped to provide the encapsulating plastic body 12 having the cross-sectional shape as is more particularly illustrated in FIG. 3 consisting of a curved upper surface 12a and a bottom surface having an elongated channel formed by a flat wall 12b. In a preferred embodiment, use was made of a double-sided adhesive strip 14 arranged with one side 14a adhesively secured to the flat wall 12b and the other side 14b available for adhesive securement or attachment of the strip 10 to the automobile. As generally understood, adhesive surface 14b has a protective backing strip 14c provided with an appropriately treated surface which permits ready release from the adhesive surface 14b preparatory to attachment of the strip 10 to the automobile.

In accordance with the present invention, encapsulated within the plastic body 12 during extrusion thereof, are two selected materials which contribute to the functioning of the strip 10 as a decorative and reflective strip and also as a strip having a significant safety function. One such material is an elongated strip 16 of a metallic foil, preferably aluminum foil, which has the necessary silver, shiny appearance to realistically simulate the appearance of chromium trim such as is commonly used as decoration for automobiles, particularly as border trim for the rear window W. Strip 16, as clearly illustrated in FIG. 3, is disposed in substantially parallel relationship to the curved edge 12a and includes a curved end 16a which in following the curvature of surface 12a at the widest portion of the body 12 extends transversely of the body 12. The second selected material is a strip 18 of light reflective material, preferably red reflective tape, which is disposed in superposed position along the foil 16 such that both strips 16, 18 are visible to an observer looking through the surface 12a. In a preferred embodiment, the width of strip 16 is approximately five-eights of an inch and that of strip 18 is one-quarter inch. By virtue of the smaller size of the strip 18 relative to the foil 16, it has been found that during daylight the essential appearance of the strip 10 is the appearance provided by the foil 16, namely, an appearance which realistically simulates the appearance of chromium trim of an automobile. At night, however, when a car approaches a car having the strip 10 from the rear, the light from this approaching car impinges on the strip 10 and is reflected by the tape 18. The reflected light produces a visible red rectangle on the rear of the car and this, of course, helps call attention of the driver of the approaching car to the presence of the car having strip 10 thereon and thus serves a significant safety function.

A latitude of modification, change and substitution is intended in the foregoing disclosure and in some instances some features of the invention will be employed without a corresponding use of other features.

What we claim is:

1. A combination decorative and reflective strip for use on an automobile reveal molding comprising a first elongated strip of metallic foil of a prescribed width having an appearance simulating the appearance of chromium trim of an automobile, a second elongated strip fabricated of a light reflective material having a lesser width and a prominently visible color contrasting with that of said first elongated strip disposed in a superposed position on said first elongated strip, said first and second elongated strips being substantially of equal length, an elongated transparent plastic body in an encapsulating position about said first and second elongated strips, securing means to attach said combination strip to an automobile with said first and second elongated strips exposed to view, whereby during daylight said combination strip visually simulates chromium trim of said automobile and at night has a safety function by reflecting light impinging thereon, and said combination strip including an elongated channel to receive said securing means.

2. A combination decorative and reflective strip as defined in claim 1, wherein said second elongated strip is less than one-half the width of said first elongated strip.

3. A combination decorative and reflective strip as defined in claim 2 wherein said first elongated strip is fabricated of aluminum foil and said second elongated strip is fabricated of red reflective tape.

4. A combination decorative and reflective strip for use on an automobile reveal molding comprising a first elongated strip of aluminum foil of a prescribed width having an appearance simulating the appearance of chromium trim of an automobile, a second elongated strip fabricated of a red reflective tape having a lesser width than said first elongated strip disposed in a superposed position on said first elongated strip, said first and second elongated strips being substantially of equal length, an elongated transparent plastic body in an encapsulating position about said first and second elongated strips, adhesive means disposed along said plastic body on a side remote from said second elongated strip to attach said combination strip to an automobile with said first and second elongated strips exposed to view, whereby during daylight said combination strip visually simulates chromium trim of said automobile and at night has a safety function by reflecting light impinging thereon, and said combination strip including an elongated channel to receive said adhesive means.

5. A combination decorative and reflective strip as defined in claim 4 wherein said adhesive means comprises a double-sided adhesive strip having one side adhesively secured to said plastic body and effective to make adhesive attachment with said other side to said automobile.

6. A combination decorative and reflective strip as defined in claim 4 wherein said second elongated strip is less than one-half the width of said first elongated strip.